(12) United States Patent
Shintani

(10) Patent No.: US 7,677,378 B2
(45) Date of Patent: Mar. 16, 2010

(54) VEHICULAR TRANSMISSION

(75) Inventor: Masanori Shintani, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/285,083

(22) Filed: Sep. 29, 2008

(65) Prior Publication Data

US 2009/0200134 A1    Aug. 13, 2009

(30) Foreign Application Priority Data

Feb. 7, 2008    (JP) .......................... P2008-028036

(51) Int. Cl.
*F16H 3/093* (2006.01)
*B60T 1/06* (2006.01)

(52) U.S. Cl. ...................... 192/219.5; 74/331; 74/411.5

(58) Field of Classification Search ............... 192/219.5
See application file for complete search history.

(56) References Cited

U.S. PATENT DOCUMENTS

| | | | |
|---|---|---|---|
| 4,177,886 A * | 12/1979 | Hiraiwa et al. ........... | 192/219.5 |
| 4,310,081 A * | 1/1982 | Kolacz .................... | 192/219.5 |
| 7,360,466 B2 | 4/2008 | Seo et al. | |
| 2006/0169078 A1* | 8/2006 | Hiraiwa ....................... | 74/331 |
| 2008/0242466 A1* | 10/2008 | Kasuya ........................ | 475/206 |

FOREIGN PATENT DOCUMENTS

| | | |
|---|---|---|
| DE | 11 2004 000 109 T5 | 12/2005 |
| JP | H03-000364 U | 1/1991 |
| JP | 2004-263708 A | 9/2004 |
| JP | 2006-52832 A | 2/2006 |
| JP | 2007-321818 A | 12/2007 |

* cited by examiner

*Primary Examiner*—Rodney H Bonck
(74) *Attorney, Agent, or Firm*—Birch, Stewart, Kolasch & Birch, LLP

(57) ABSTRACT

A vehicular transmission, includes: an input shaft; a drive gear, fixed to the input shaft; an output shaft; a driven gear, brought in mesh with the drive gear, and provided at the output shaft; a hub configured to rotate along with the output shaft; a sleeve configured to rotate integrally with the hub, and configured to slide in an axial direction so as to connect the driven gear to the output shaft to drive; a parking gear, integrally formed with the sleeve; a claw member, provided at a vicinity of an outer periphery of the parking gear engageably with and disengageably from the parking gear; and a sleeve restricting member, provided with the claw member, and configured to restrict the sleeve from a movement in the axial direction when the claw member is moved in a direction of being engaged with the parking gear.

9 Claims, 6 Drawing Sheets

VEHICULAR TRANSMISSION

BACKGROUND

1. Field of the Invention

The present invention relates to a transmission for a vehicle including a parking gear.

2. Description of the Related Art

In an automatic transmission of a vehicle (automobile), there is a transmission referred to as a double clutch (also referred to as twin clutch or dual clutch) transmission for changing speed continuously while restraining a loss of a power by using a normal mesh type gear mechanism in which a drive gear and a driven gear are normally brought in mesh with each other.

In a vehicle including an automatic transmission, inside of the transmission is provided with a parking gear and a claw member arranged at a vicinity of an outer periphery of the drive gear to be able to be engaged with and disengaged from the parking gear at inside of the transmission such that the vehicle is prevented from moving unpreparedly in a state of parking the vehicle and the vehicle is prevented from being moved unpreparedly in a parking state by engaging a front end of the claw member with the parking gear.

Recently, there is known a structure of integrating a parking gear between driven gears of an output shaft such that an excessive torque (caused by a vehicle weight when parked at an inclined location) is prevented from being applied to the parking gear. For example, as disclosed in JP-A-2006-52832, it is described that in a transmission constituting a forward speed changing stage by 6 stages, constituting a rearward speed changing stage by 1 stage, distributing three driven gears of 5 speed, 6 speed, reverse to a first output shaft, and distributing four driven gears of 1 speed, 2 speed, 3 speed, 4 speed to a second output shaft and providing a parking gear between the driven gears of the second output shaft, for example, between the driven gear of 3 speed and the driven gear of 4 speed.

However, according to the transmission of the above-described example, in providing the parking gear at the output shaft, the parking gear is arranged at the output shaft in series with other gear, and therefore, there poses a problem that the output shaft is prolonged and an axial direction length of the transmission is prolonged. Hence, the inventors of the application have investigated to shorten the axial direction length by arranging the parking gear at a well-known synchronizer sleeve for connecting the driven gear to the output shaft to drive. Generally, the synchronizer sleeve is constituted so as not to move in the axial direction unless a predetermined or larger force is exerted in the axial direction by a well-known detent mechanism. However, when the parking gear is provided to the synchronizer sleeve, there is a rare case in which an operating force in engaging a claw member with the parking gear exceeds a restricting force by the detent mechanism from a positional relationship between the parking gear and the claw member and a behavior of the synchronizer sleeve becomes unstable. When the synchronizer sleeve is assumedly moved in the axial direction, also a position of the parking gear is moved and there is a concern that the engagement with the claw member becomes unstable.

Further, in a vehicle of FF (front engine front drive) type, a front portion of the vehicle is integrated with an engine, a transmission, a drive mechanism, a steering mechanism and the like, further, in a transversely placed engine, the engine is provided between tires, side members or the like, and therefore, it is required that a length in the axial direction of the transmission to be as short as possible.

SUMMARY

It is therefore one advantageous aspect of the invention to provide a vehicular transmission capable of stably making a parking brake function while restraining a length in an axial direction thereof.

According to an aspect of the invention, there is provided a vehicular transmission, including: an input shaft, configured to receive a drive force from a side of an engine; a drive gear, fixed to the input shaft, and configured to rotate along with the input shaft; an output shaft, provided in parallel with the input shaft; a bearing, configured to rotatably support a shaft end of the output shaft; a driven gear, brought in mesh with the drive gear, and provided pivotably at the output shaft; a hub, fixed to the output shaft contiguous to the driven gear on a side of the shaft end of the output shaft, and configured to rotate along with the output shaft; a sleeve, provided on an outer peripheral side of the hub, configured to rotate integrally with the hub, and configured to slide in an axial direction so as to connect the driven gear to the output shaft to drive; a parking gear, integrally formed with the sleeve; a claw member, provided at a vicinity of an outer periphery of the parking gear engageably with and disengageably from the parking gear; and a sleeve restricting member, provided with the claw member, and configured to restrict the sleeve from a movement in the axial direction when the claw member is moved in a direction of being engaged with the parking gear.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

An embodiment of a vehicular transmission according to the invention will be explained in reference to the drawings.

Figure 1:
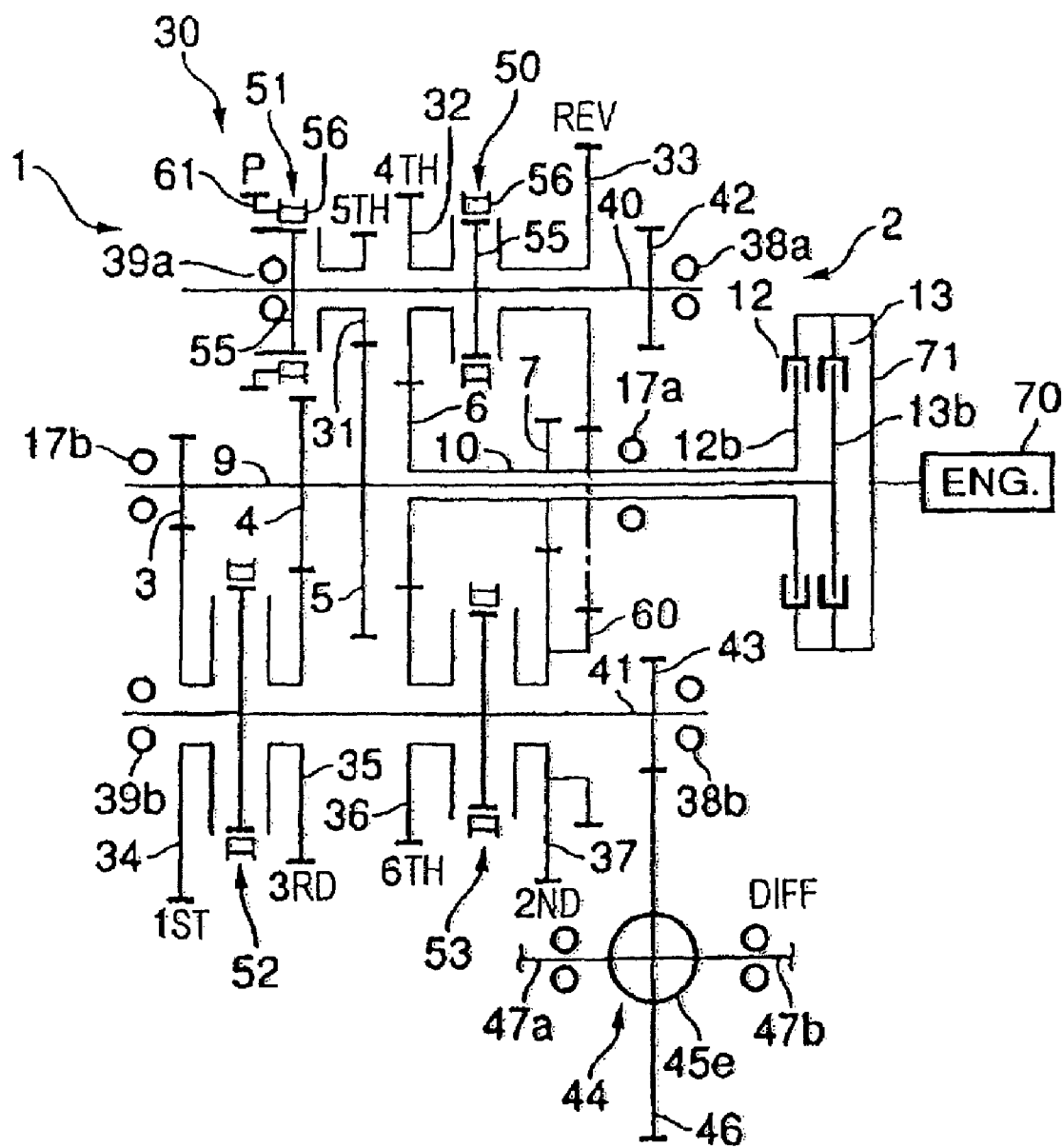
FIG. 1 is an outline view schematically showing a constitution of a vehicular transmission according to an embodiment of the invention.

FIG. 1 shows an outline constitution of a vehicular transmission. The vehicular transmission is a double clutch transmission of a transversely vehicle mounting type having speed changing stages of a total of 7 speeds, among which 6 speeds are for a forward stage and 1 stage is for a rearward stage. Notation 1 in the drawing designates a main body portion of the double clutch transmission, and the main body portion 1 is constituted by a structure of integrating an input mechanism 2 and an output mechanism 30.

The input mechanism 2 is constituted by a structure of integrating two of input shafts 9, 10 constituting a first and a second input shaft arranged with drive gears 3 through 7, and two of clutches 12, 13 constituting a first and a second clutch.

The output mechanism system 30 is constituted by including two of output shafts 40, 41 constituting a first and a second output shaft arranged with driven gears 31 through 37 and synchronizing mechanisms 50 through 53.

Figure 2:
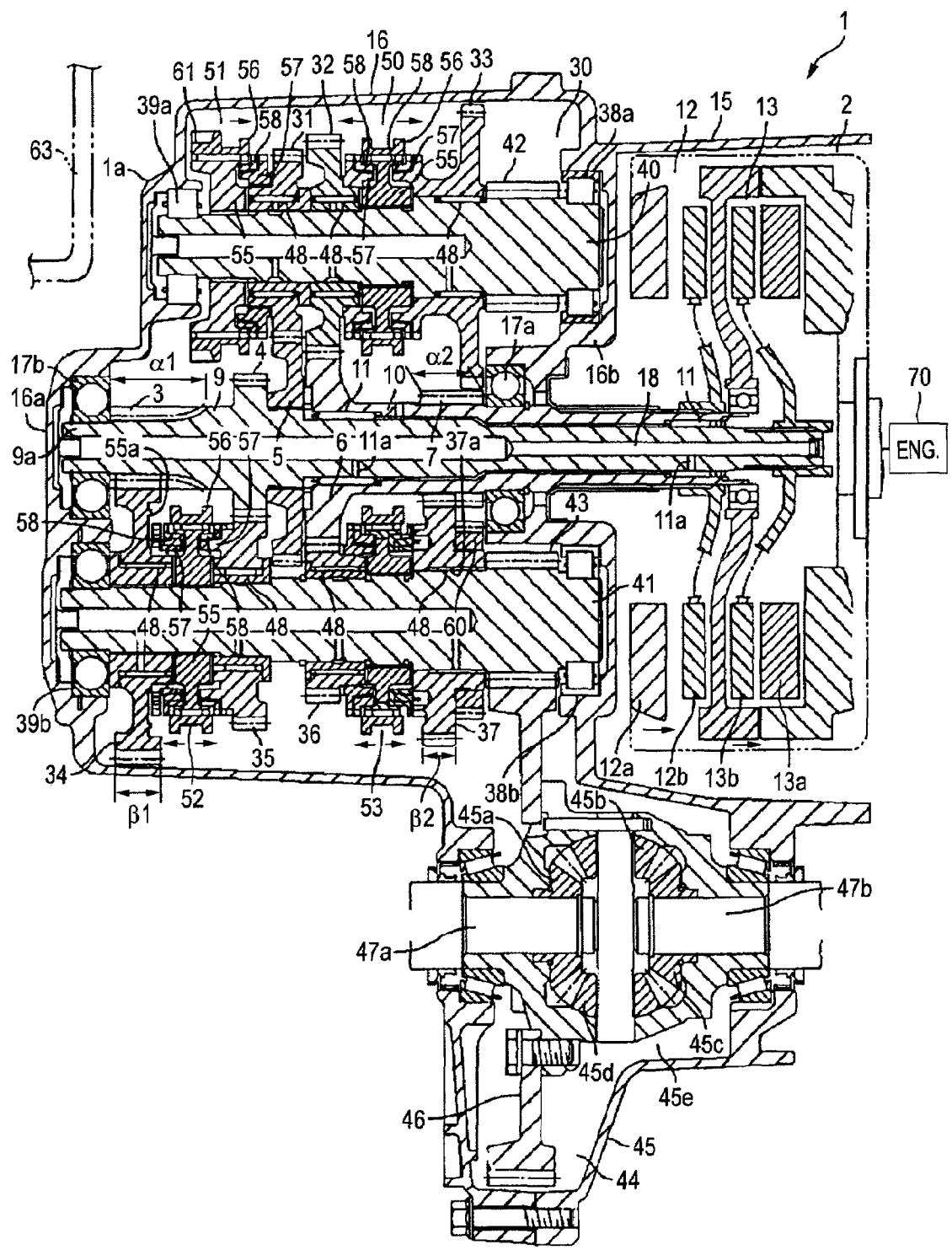
FIG. 2 is a sectional view showing a constitution of the vehicular transmission according to the embodiment of the invention.
Figure 3:
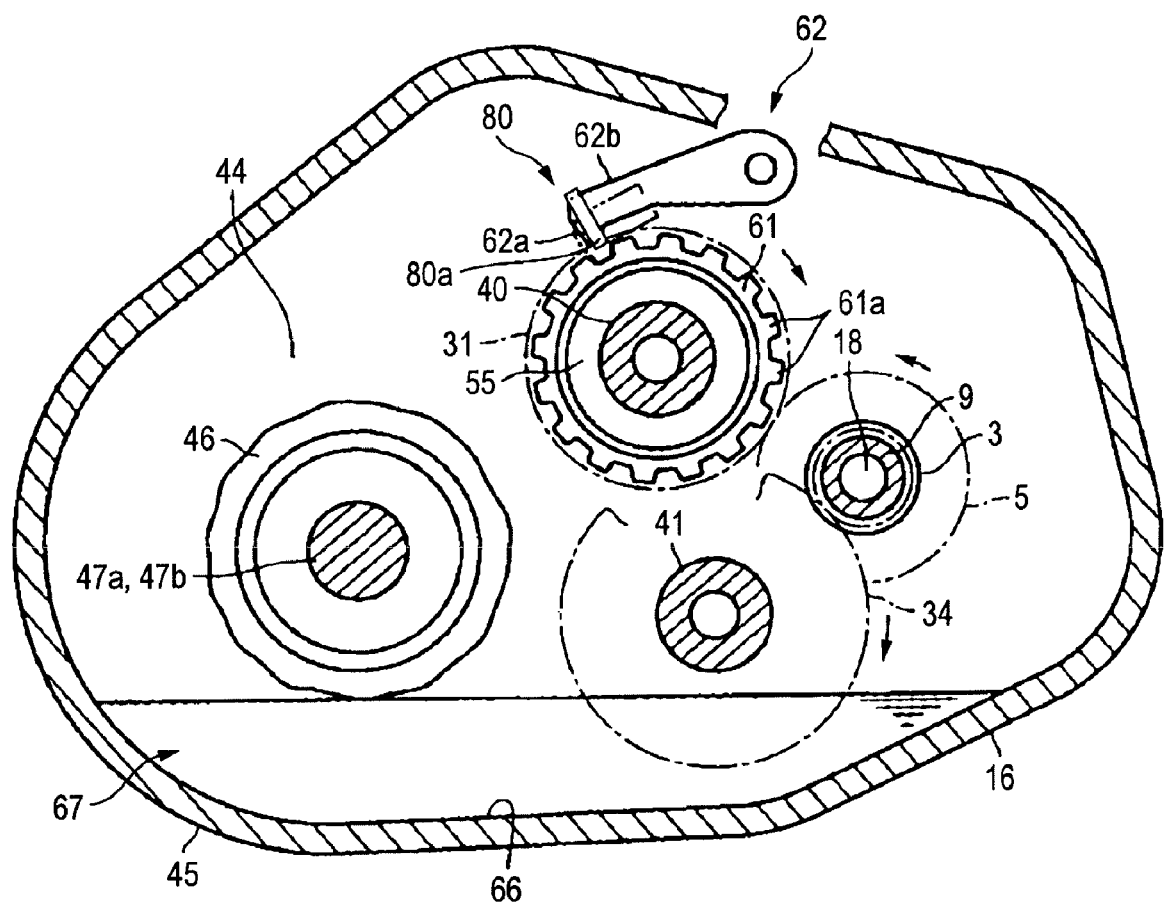
FIG. 3 is a sectional view viewing the transmission from an axial direction.

Next, the structure of the input mechanism 2 will be explained in reference to FIG. 2 and FIG. 3. FIG. 2 is a regular sectional view developing a double clutch transmission, and FIG. 3 is a side sectional view of the double clutch transmission. In FIG. 2, notation 15 designates a clutch housing, 16 designates a transmission case connected in series with the clutch housing 15, and the clutches 12, 13 are contained at inside of the clutch housing 15.

The clutches 12, 13 are aligned with, for example, two sets of pusher plates 12a, 13a communicating with an output shaft of an engine 70 and two sets of independent dry type clutch plates 12b, 13b respectively communicated with the input shafts 9, 10 alternately in an axial direction, and by moving (operating) the respective pusher plates 12a, 13a, the respective pusher plates 12a, 13a are made to function to be brought into close contact with and separated from the clutch plates 12b, 13b.

Inside of the transmission case 16 is arranged with the input shafts 9, 10 substantially at a center thereof. The input shaft 9 is extended from a vicinity of an opening of the clutch housing 15 to a depth portion at inside of the transmission case 16, that is, a vicinity of an end wall 16a on a side opposed to the clutches 12, 13. The input shaft 9 is formed with a through hole 18 for passing a lubricant 67 (illustrated only in FIG. 3) at an axis core.

The input shaft 10 is constituted by a shape of a circular cylinder and integrated to an outer peripheral face of the input shaft 9 by way of a needle bearing 11 and the input shaft 9 and the input shaft 10 are made to be pivotable with each other by the needle bearing 11. Notation 11a designates a through hole for guiding the lubricant 67 from the through hole 18 to the needle bearing 11.

The input shaft 10 is provided with a length of substantially a half of that of the input shaft 9 and covers an outer periphery of the input shaft 9 from one end side on a side of the clutches 12, 13 to substantially a center of inside of the transmission case 16. A portion of double shafts including the input shaft 9 and the input shaft 10 is supported by a bearing 17a provided at a middle portion thereof. The bearing 17a is integrated to the end wall 16b partitioning the clutch housing 15 and the transmission case 16. The input shaft 9 and the input shaft 10 are pivotably supported respectively by the bearing 17a and a bearing 17b mentioned above and the needle bearing 11 and made to be pivotable around respective axis centers.

The end portion of the input shaft 9 projected into the clutch housing 15 is connected to the clutch 13, specifically, the clutch plate 13b of the clutch 13, similarly, the end portion of the input shaft 10 is connected to the clutch plate 12b of the clutch 12. Further, when the clutch 13 is connected, a rotational force outputted from the engine 70 is transmitted to the input shaft 9 and when the clutch 12 is connected, the rotational force outputted from the engine 70 is transmitted to the input shaft 10. That is, by operating the clutches 12, 13, the rotational force of the engine 70 is transmitted selectively to either one of the input shaft 9 and the input shaft 10.

The input shafts 9, 10 are provided with the drive gears 3 through 7. Specifically, the forward speed change stage (1 through 6 speed) including the drive gears 3 through 7 is divided into two speed change stage groups, that is, speed change stage groups of even number speed change stages and odd number speed change stages, and the drive gears 3 through 5 in correspondence with the odd number speed change stage group are provided at the input shaft 9.

Specifically, a shaft portion 9a projected from the input shaft 10 (input shaft 9) is provided with the drive gear 3 for 1st speed, the drive gear 4 for 3rd speed, the drive gear 5 for 5th speed in this order from a point (rear end side of transmission) contiguous to the bearing 17b. Particularly, the drive gear 3 for 1st speed is made to increase a speed reduction ratio by using a structure of forming meshing teeth directly on an outer peripheral face of the shaft portion 9a by a tool without forming a hub portion in a shape of a circular disk at the shaft portion 9a without forming the meshing teeth at the hub portion by a tool as in other drive gears 4, 5 for 3rd speed or for 5th speed. Further, at the drive gear contiguous to the drive gear 3 for 1st speed, a next gear on a low speed side, that is, the drive gear 4 for 3rd speed is arranged, and in forming the drive gear 3 for 1st speed, an interference with the tool is avoided by a short distance and an increase in a distance between the drive gears is restrained.

The drive gears in correspondence with the even number speed change stage group are provided at the input shaft 10. Specifically, the input shaft 10 is provided with the drive gear 6 for both of 4th speed and $6^{th}$ speed, the drive gear 7 for 2nd speed in this order from an end portion on a rear end side of the transmission. Thereby, when the clutch 13 is connected, the rotational force of the engine 70 is transmitted to the drive gears 3 through 5 of odd number stages and when the clutch 12 is connected, the rotational force of the engine 70 is transmitted to the drive gears 6 and 7 of the even number stages.

Next, the output mechanism 30 will be explained in reference to FIG. 2 and FIG. 3. Both of the output shafts 40, 41 constituting the output mechanism 30 are arranged in parallel with the input shafts 9, 10 at inside of the transmission case 16. The output shaft 40 is arranged on an upper side of the input shafts 9, 10 (input shaft portion) of a double structure and the output shaft 41 is arranged on a lower side of the input shafts 9, 10.

Both of the output shafts 40, 41 are arranged by aligning end portions on sides of the clutches 12, 13 at a position of the end wall 16b. The respective aligned shaft ends of the output shafts 40, 41 are rotatably supported by respective bearings 38a, 38b integrated to the end wall 16b. Further, shaft ends constituting a transmission rear end side of the output shafts 40, 41 are rotatably supported by respective bearings 39a, 39b integrated to the end wall 16a.

End portions on sides of the clutches 12, 13 of the output shafts 40, 41 are respectively provided with output gears 42, 43, and the output gears 42, 43 are brought in mesh with a differential mechanism 44 integrated to a side portion of the transmission case 16 as shown by FIG. 3.

The differential mechanism 44 is constituted by a differential gear portion 44e formed by a combination of respective elements, specifically, pinion gears 45a through 45d, a ring gear 46 (reduction gear) for inputting rotation to the differential gear portion 44e, axles 47a, 47b for transmitting the rotational force distributed by the differential gear portion 44e to left and right drive wheels (not illustrated) at inside of an outer wall 45 formed by a side portion of the transmission case 16. The output gears 42, 43 are brought in mesh with the ring gear 46 of the differential mechanism 44. Further, a speed reduction ratio of the output gears 42, 43 may be set such that a final speed reduction ratio of the output shaft 40 becomes larger than a final speed reduction ratio of the output shaft 41.

The output shaft 40 is arranged with the three driven gears in an order of the driven gear 31 for the 5th speed brought in mesh with the drive gear 5, the driven gear 32 for the 4th speed brought in mesh with the drive gear 6, the driven gear 33 for reverse from a side of the bearing 39a. The output shaft 41 is arranged with the four driven gears in an order of the driven gear 34 for the 1st speed brought in mesh with the drive gear 3, the driven gear 35 for the 3rd speed brought in mesh with the drive gear 4, the driven gear 36 for the 6th speed brought in mesh with the drive gear 6, the driven gear 37 for the 2nd speed brought in mesh with the drive gear 7 from a side of a bearing 39b. The output shafts 40, 41 are distributed with the driven gears 31 through 36 such that a number of speed change stages of the output shaft 40 becomes smaller than a number of speed change stages of the output shaft 41.

Here, in the gears, both of tooth width dimensions $\alpha 1$, $\alpha 2$ of the drive gears 3, 7 (1st speed, $2^{nd}$ speed) of low speed stage gears arranged contiguous to the bearings 17a, 17b are made to be larger than tooth width dimensions $\beta 1$, $\beta 2$ of the driven gears 34, 37 brought in mesh therewith. Further, only the driven gears 34, 37 brought in mesh with the drive gears 3, 7 having wide width are brought in mesh therewith in a state of being made to be proximate to one sides in a width direction. The driven gears 31 through 37 are rotatably supported by outer peripheral faces of the output shafts 40, 41 by using needle bearings 48 all of which constitute bearing portions.

Synchronizing mechanisms 50 through 53 are distributed in accordance with a layout of the driven gears 31 through 37 (layout making a speed change stage number on the side of the output shaft 40 smaller than that on the side of the output shaft 41), and provided at the output shafts 40, 41. Specifically, a shaft portion of the output shaft 40 between the driven gear 32 (for 4th speed) and the driven 33 (for reverse) is arranged with the synchronizing mechanism 50 for selecting 4th speed and reverse of two direction types in shift directions, and a shaft portion thereof on a side of the bearing 39a interposing the driven gear 31 (for 5th speed) is arranged with the synchronizing mechanism 51 for selecting 5th speed of one direction type in a shift direction.

Further, a shaft portion of the output shaft 41 between the driven gear 34 (for 1st speed) and the driven gear 35 (for 3rd speed) is arranged with the synchronizing mechanism 52 for selecting 1st speed and 3rd speed of two direction type in shift direction, and a shaft portion thereof between the driven gear 36 (for 6th speed) and the driven gear 37 (for 2nd speed) is arranged with the synchronizing mechanism 53 for selecting 6th speed and 2nd speed of two direction type in shift direction. By aligning the respective gears and the respective synchronizing mechanisms in this way, the end portion of the output shaft 40 on the upper side is escaped to the side of the clutches 12, 13 by a difference of the speed change stage number relative to the output shaft 41 on the lower side. That is, a total length of the output shaft 40 becomes shorter than that of the output shaft 41.

There is used a structure in which all of the synchronizing mechanisms 50, 52, 53 in two direction type are fitted with synchronizer hubs 55 by splines, an outer peripheral portion of the synchronizer hub 55 is integrated with a synchronizer sleeve 56 as a sleeve slidably in an axial direction, respective gears arranged on both sides of the synchronizer hubs 55 are respectively formed with synchronizer cones 57 and synchronizer rings 58 are fitted to be inserted respectively to cone faces of outer peripheries of the synchronizer cones 57. Further, the notations are illustrated at the synchronizing mechanism 50, 52.

Thereby, in the respective synchronizing mechanism 50, 52, 53, when the synchronizer sleeves 56 are slid in either direction in the axial direction, by friction of the synchronizer ring 58 and the synchronizer cone 57, while reducing a rotational speed difference, the output shaft 40 or the output shaft 41 and the driven gears of the respective speed change stages are engaged (synchronizing mesh) and the both members are integrally rotated. The synchronizer sleeve 56 is constituted not to move in the axial direction unless a constant or more of force is exerted in the axial direction by a well-known detent mechanism, not illustrated.

Here, the synchronizing mechanism 52 integrated to the driven gear 34 (for 1st speed) is larger than an outer diameter of the synchronizer sleeve 56 in a gear diameter thereof and is arranged as proximate to the driven gear 34 as possible. A structure of making proximate thereto is constituted such that a recess portion 55a in a ring-like shape is formed around an axis center over a total of a side face on a side of the synchronizing mechanism 52 of the driven gear 34, inside of the recess portion 55a is provided with the synchronizer ring 58, the synchronizer cone 57, and a portion of the sliding synchronizer sleeve 56 is brought to inside of the recess portion 55a. That is, the synchronizer sleeve 56 of the synchronizing mechanism 52 completes synchronizing mesh at a position brought from a side face to an inner side of the driven gear 34 (for 1st speed) more than other speed change stage and a distance from the driven gear 34 to the synchronizer hub 55 is made to be short by that amount.

The synchronizing mechanism 51 of one direction type is constituted by a structure the same as the structure in which the synchronizer cone 57, the synchronizer ring 58 on one side of the synchronizing mechanisms 50, 52 of two direction type is omitted, and a shift direction is constituted only by one direction of being remote from the bearing 39a. That is, when the synchronizer sleeve 56 is slid to the driven gear 31, while reducing the rotation speed difference by friction, the output shaft 40 and the driven gear 31 for 5th speed are engaged.

Further, a side portion of the driven gear 37 (for 2nd speed) on a side opposed to a side of the synchronizing mechanism 53 is coaxially attached with an idler gear 60 for reverse. The idler gear 60 is smaller than the driven gear 37 in a gear diameter thereof, brought in mesh with the driven gear 33 for reverse of the output shaft 40, and when the driven gear 33 for reverse is engaged with the output shaft 40 by the synchronizing mechanism 50, an output of a reverse rotation a speed of which is reduced by speed reduction ratio of 2nd speed speed change stage, a speed reduction ratio of reverse speed change stage, further, a final speed reduction ratio of the output shaft 40 and is transmitted to the differential mechanism 44.

Further, an end portion (escaped end portion) of the output shaft 40 on the side of the rear end of the transmission is provided with a parking gear 61 as shown by FIG. 2. The synchronizer sleeve 56 of the synchronizing mechanism 51 is extended to a side of the bearing 39a, and the parking gear 61 is provided at the extended synchronizer sleeve 56 integrally with an extended outer peripheral face thereof. That is, the parking gear 61 is formed integrally with the synchronizer sleeve 56 moved to a side of the synchronizer cone 57 when the synchronizing mechanism 51 is operated.

The synchronizer hub 55 is extended to a side of the bearing 39a similar to the synchronizer sleeve 56, an inner diameter of a shaft end side of the synchronizer hub 55 is formed to be larger than an outer diameter of the bearing 39a and a portion of a shaft end side of the synchronizer hub 55 is provided to overlap an outer side of the bearing 39a (overlapped).

As shown by FIG. 3, a vicinity of an outer periphery of the parking gear 61 is provided with a claw member 62 for locking integrated to the transmission case 16 engageably and disengageably with and from the parking gear 61, and when the gear is set to parking by operating a shift control lever, not illustrated, the claw member 62 is engaged with the parking gear 61, and the output shaft 40 is locked. By locking the output shaft 40, the axle 47a and the axle 47b are locked.

By attaching the parking gear 61 in this way, as shown by FIG. 2, there is constructed a constitution in which a side portion of an upper stage of the main body portion 1 can be escaped, that is, can be constituted by a shape of restraining an extrusion on the rear end side of the transmission more than other portion, when the double clutch transmission is mounted transversely at an engine room (not illustrated) of a vehicle, an interference with the skeleton member of a vehicle body, for example, a side frame 63 can be avoided.

Figure 4:
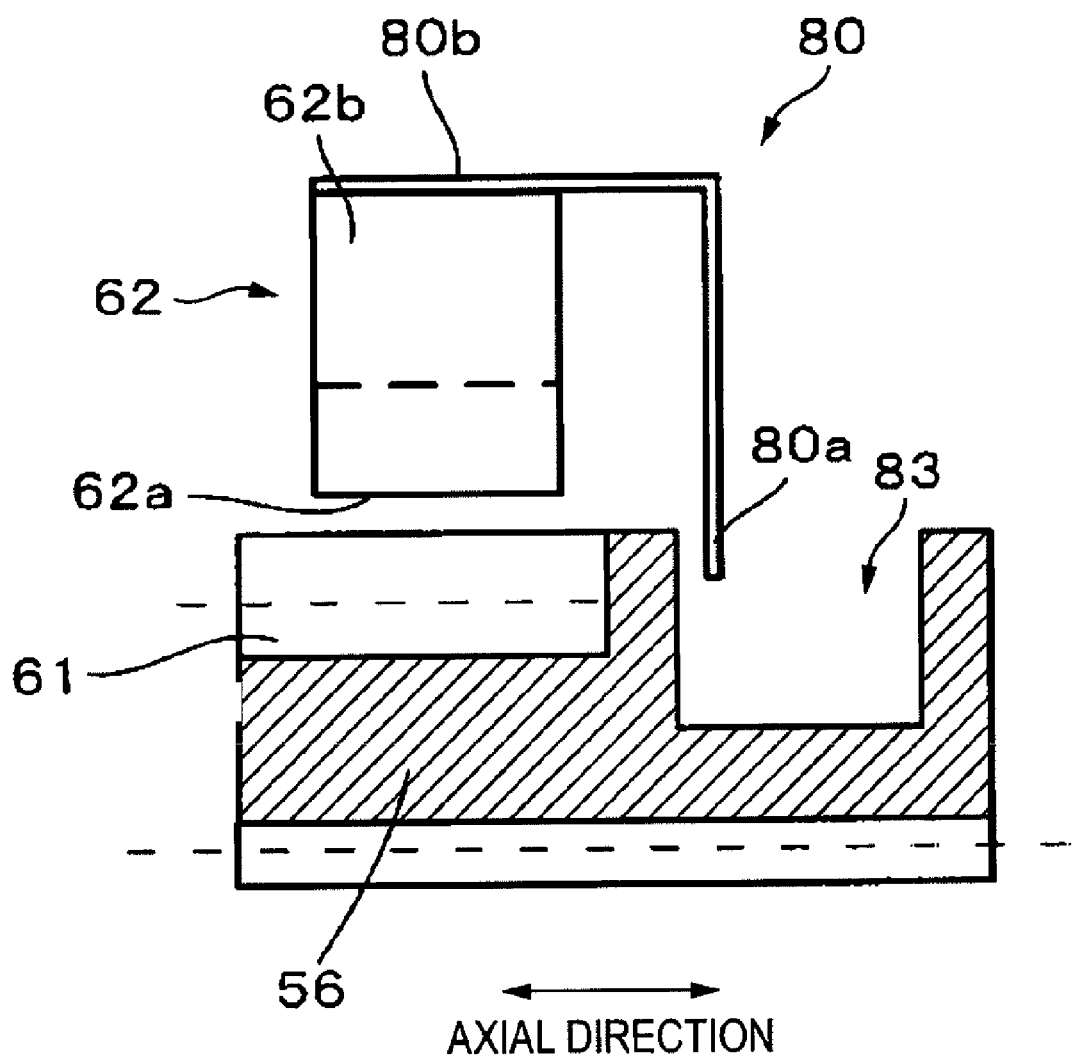
FIG. 4 is an enlarged view showing a constitution of a sleeve restricting member.

As shown by FIG. 3, FIG. 4, the claw member 62 is provided with a sleeve restricting member 80 for rectifying a movement of the synchronizer sleeve 56 in the axial direction when the claw member 62 is moved in a direction of being engaged with the parking gear 61. The sleeve restricting member 80 is made of a sheet metal and a shape of a total thereof constitutes an L-like shape in a section thereof. Other end 80b of the sleeve restricting member 80 is fixed to an upper face 62b of the claw member 62 made of a metal by welding such that one end 80a thereof is disposed on a side of the parking gear 61. Although the fixing method may be constituted not by welding but by fastening using a bolt or the like, a space at inside of the transmission case 16 is narrow and in consideration of a positional shift or the like by loosening, it is preferable to fix by welding.

The sleeve restricting member 80 is constructed by a constitution in which in a state of being fixed to the claw member 62, the one end 80a is formed to project to a side of the parking gear 61 more than a front end 62a of the claw member 62 engaged with the parking gear 61, and inserted to be engaged with a shift fork groove 83 formed at the synchronizer sleeve 56.

An operation of connecting and disconnecting the respective clutches 12, 13 (pusher plates 12a, 13a) or an operation of shifting to select the respective synchronizing mechanisms 50 through 53 is carried out by an actuator controlled by, for example, an instruction of ECU (both of which are not illustrated). Further, the double clutch transmission carries out automatic transmission in accordance with speed change information set by ECU while minimizing a loss of cutting power transmission.

Next, an operation of the double clutch transmission will be explained. In setting 1st speed, first, by the actuator operated by a speed change instruction outputted from ECU, the synchronizer sleeve 56 of the synchronizing mechanism 52 of the odd number speed change stage group is slid to a side of 1st speed to engage the driven gear 34 for 1 speed and the output shaft 41. Thereby, the speed change stage of the $1^{st}$ speed is selected. Thereafter, the clutch 13 is operated to connect by the actuator similarly operated by the speed change instruction. By connecting the clutch 13, shift of the $1^{st}$ speed is completed. Thereby, the output of the engine 70 is changed in the speed by a transmission line of odd number route transmitted to the input shaft 9, the drive gear 3 for the $1^{st}$ speed, the driven gear 34 for the $1^{st}$ speed, the output shaft 41. Further, a rotational output the speed of which is changed is transmitted from the output shaft 43 to the differential mechanism 44, transmitted to the left and right axles 47a, 47b, and the vehicle is run by the 1st speed. Further, in such a state, the clutch 12 is brought into a disconnected state.

When an instruction of changing speed to the $2^{nd}$ speed is outputted in running by the $1^{st}$ speed, since although the clutch 13 is connected, the clutch 12 is brought into the disconnected state, the synchronizer sleeve 56 of the synchronizing mechanism 53 of the even number speed change group is slid to a side of the $2^{nd}$ speed beforehand, and the driven gear 37 for the $2^{nd}$ speed can be engaged with the output shaft 41 rotated at a current vehicle speed. Thereby, the drive gear 7 of the $2^{nd}$ speed speed change stage constituting next stage is synchronized with the vehicle speed and the speed change stage of the $2^{nd}$ speed is selected. That is, speed change to next stage is prepared.

Thereafter, while releasing connection of the clutch 13, connection of the clutch 12 is carried out, and power transmission from the engine 70 is switched from the input shaft 9 to the input shaft 10. Then, the speed of the output of the engine 70 is changed by a transmission line of even number route transmitted to the input shaft 10, the drive gear 7 for the $2^{nd}$ speed, the driven gear 37 for the 2nd speed, the output shaft 40, and the speed changing rotation is outputted from the output gear 43 to the differential mechanism 44 (2nd speed shift complete). By switching to the $2^{nd}$ speed, the vehicle is promptly switched to the $2^{nd}$ speed running.

When a speed change instruction to the $3^{rd}$ speed is outputted in running at the $2^{nd}$ speed, which the clutch 12 is in the connected state, and the clutch 13 is in the disconnected state, the synchronizer sleeve 56 of the synchronizing mechanism 52 of the odd number speed change group is slid to the $3^{rd}$ speed side beforehand, and the driven gear 35 for the $3^{rd}$ speed can be engaged with the output shaft 40 rotated at the current vehicle speed. Thereby, the speed change stage of the 3rd speed is selected by synchronizing the drive gear 4 of the $3^{rd}$ speed speed change stage constituting a next stage with the output shaft 40. Thereby, the drive gear 4 of the $3^{rd}$ speed speed change stage constituting the next stage is synchronized with the vehicle speed and the speed change stage of the $3^{rd}$ speed is selected. That is, the speed change to the next stage is prepared. Thereafter, while releasing connection of the clutch 12, connection of the clutch 13 is carried out, the transmission of the engine 70 is switched again from the input shaft 10 to the input shaft 9. Then, the speed of the output from the engine 70 is changed by the transmission line of the odd number route transmitting to the input shaft 9, the drive gear 4 for the $3^{rd}$ speed, the driven gear 35 for the $3^{rd}$ speed, the output shaft 41, and the speed changing rotational output is transmitted from the output gear 43 to the differential mechanism 44 (3rd speed shift complete). By switching to the $3^{rd}$ speed, the vehicle is promptly switched to the $3^{rd}$ speed running.

Further, by alternately switching the clutches 12, 13 by alternately selecting the speed change stage by the odd number speed change group, the even number speed change group similar to the above-described by the synchronizing mechanisms 50, 51, 53 and the clutches 12, 13, in shifting remaining speed change stages of the $4^{th}$ speed, 5th speed, 6th speed, similar to the above-described speed change operation of 1 through the $3^{rd}$ speed, the speed is changed continuously and swiftly while minimizing the transmission loss.

Further, in changing speed to the reverse speed change stage, the driven gear 33 for reverse and the output shaft 40 are engaged by sliding the synchronizer sleeve 56 of the synchronizing mechanism 50 to the reverse speed side while the clutches 12, 13 are disconnected. Thereby, the speed change stage of reverse speed is selected. Thereafter, the clutch 12 is disconnected. Thereby, the output from the engine 70 is transmitted to the differential mechanism 44 by way of the input shaft 10, the drive gear 7 for the $2^{nd}$ speed, the driven gear 37 for 2 speed, the idler gear 60 attached to the driven gear, the driven gear 33 for reverse, the output shaft 40, the output gear 42. That is, rotation of the output shaft 40 is transmitted to the differential mechanism 44 by constituting an output of reverse rotation the speed of which is reduced by a speed reduction ratio of the $2^{nd}$ speed speed change stage, a speed reduction ratio of reverse speed change stage, further, the final speed reduction ratio of the output shaft 41 and the vehicle is reversed by the large speed reduction ratio.

As shown by FIG. 3, parking lock is carried out by pivoting (moving) the claw member 62 to the engaging side by operating the actuator cooperatively moved by parking operation and engaging the claw portion 62a of the front end of the claw member 62 with a tooth portion 61a (illustrated only in FIG. 3) of the outer periphery of the parking gear 61. By the engagement, the output shaft 40 is locked, and the vehicle is constrained not to move. At this occasion, the synchronizer sleeve 56 is not operated but normally returns to the left side of the drawing.

In this way, the parking gear 61 is provided integrally with the synchronizing mechanism 51 (for the 5$^{th}$ speed) arranged at the end of the output shaft 40 and the most proximate to the shaft end at which a mesh number of the speed change stage is small, and therefore, the parking gear 61 can be provided at the output shaft 40 easily without changing the layout of the driven gears 31 through 33 (for the 5$^{th}$ speed, for the 4$^{th}$ speed, for reverse) on the output shaft 40 and the synchronizing mechanisms 51, 50 (for the 5$^{th}$ speed, for the 4$^{th}$ speed, for reverse).

Further, it is not necessary to directly provide the parking gear 61 at the output shaft 40, and therefore, a number of parts can be reduced, an integrating step can be simplified, an outer shape of the main body portion 1 of the double clutch transmission, that is, a maximum dimension in the axial direction of the transmission case 16 can be narrowed. Further, by constructing a constitution of arranging the output shaft 40 attached with the parking gear 61 and having a small number of speed change stages on the upper side and arranging the output shaft 41 having a large number of speed change stages on the lower side, as shown by FIG. 3, the large recess shape 1a escaping from the side frame 63 (skeleton member arranged in a vehicle width direction of vehicle body) of the engine room opposed to the upper stage side portion is ensured at the upper stage side portion of the main body portion 1 in being mounted to the vehicle (transversely), and therefore, a sufficient transverse mounting function can be ensured and mountability of the double clutch transmission can be promoted.

Particularly, the parking gear 61 is attached to the synchronizing mechanism 51 constituting shift direction by one direction, and therefore, one side of the synchronizing mechanism 51 which has not been used in the background art can effectively be utilized and a dead space at inside for transmission can be reduced. Further, the parking gear 61 can be provided at the outer periphery of the bearing 39a to overlap each other in the axial direction (overlapped), further small-sized formation can be carried out. Further, the synchronizer hub 55 is extended in the axial direction, and therefore, a holding portion is prolonged and the parking gear 61 can firmly be held. Further, the parking gear 61 can be installed by integrating the synchronizer sleeve 56 (synchronizing mechanism 51) to the output shaft 40 and an integrating step can considerably be simplified.

There is a rare case in which when, for example, the vehicle body is inclined in pivoting (moving) the claw member 62 to the engaging side, from a positional relationship of the parking gear 61 and the claw member 62, an operating force in engaging the claw member 62 to the parking gear 61 exceeds the restricting force by the detent mechanism and there is a case in which the synchronizer sleeve 56 is moved in the axial direction by an amount of rattle thereof. However, according to the embodiment, there is provided the sleeve restricting member 80 for rectifying the movement of the synchronizer sleeve 56 in the axial direction when the claw member 62 is moved in the direction of engaging with the parking gear 61 at the claw member 62 arranged at the vicinity of the outer periphery of the parking gear 61 engageably with and disengageably from the parking gear 61, and therefore, even when an excessively large force is operated to the parking gear 61 when the claw member 62 is engaged with the parking gear 61, the movement in the axial direction can be restricted by inserting the one end 80a of the sleeve restricting member 80 to the shift fork groove 83. Therefore, the positional relationship of the parking gear 61 and the claw member 62 is stabilized, the parking brake can stably be functioned.

Further, the one end 80a of the sleeve restricting member 80 is formed to project to the side of the parking gear 61 more than the claw portion 62a of the front end of the claw member 62 engaged with the parking gear 61, and therefore, before the parking gear 61 and the claw member 62 are engaged, the one end 80a of the sleeve restricting member 80 is engaged with the shift fork groove 83 of the synchronizer sleeve 56, and therefore, the movement of the synchronizer sleeve 56 in the axial direction can further firmly be rectified and the parking brake can further stably be functioned.

The sleeve restricting member 80 is made of a sheet metal, and therefore, a rigidity thereof can be ensured while achieving thin light-weighted formation, the movement of the synchronizer sleeve 56 in the axial direction is rectified by saving a space and the parking brake can further stably be functioned.

Figure 5:
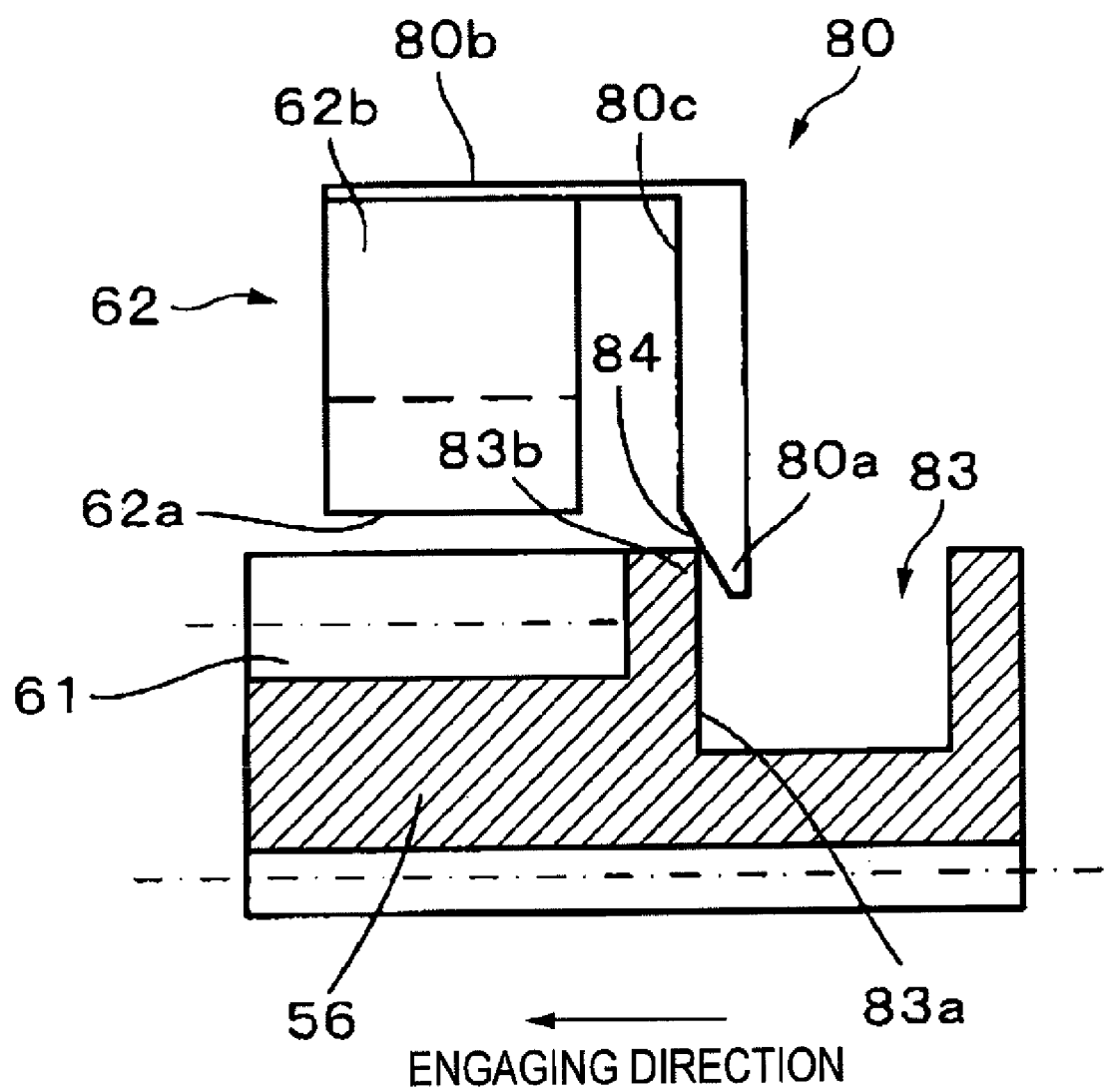
FIG. 5 is an enlarged view showing a constitution of a sleeve restricting member including a guide portion.
Figure 6:
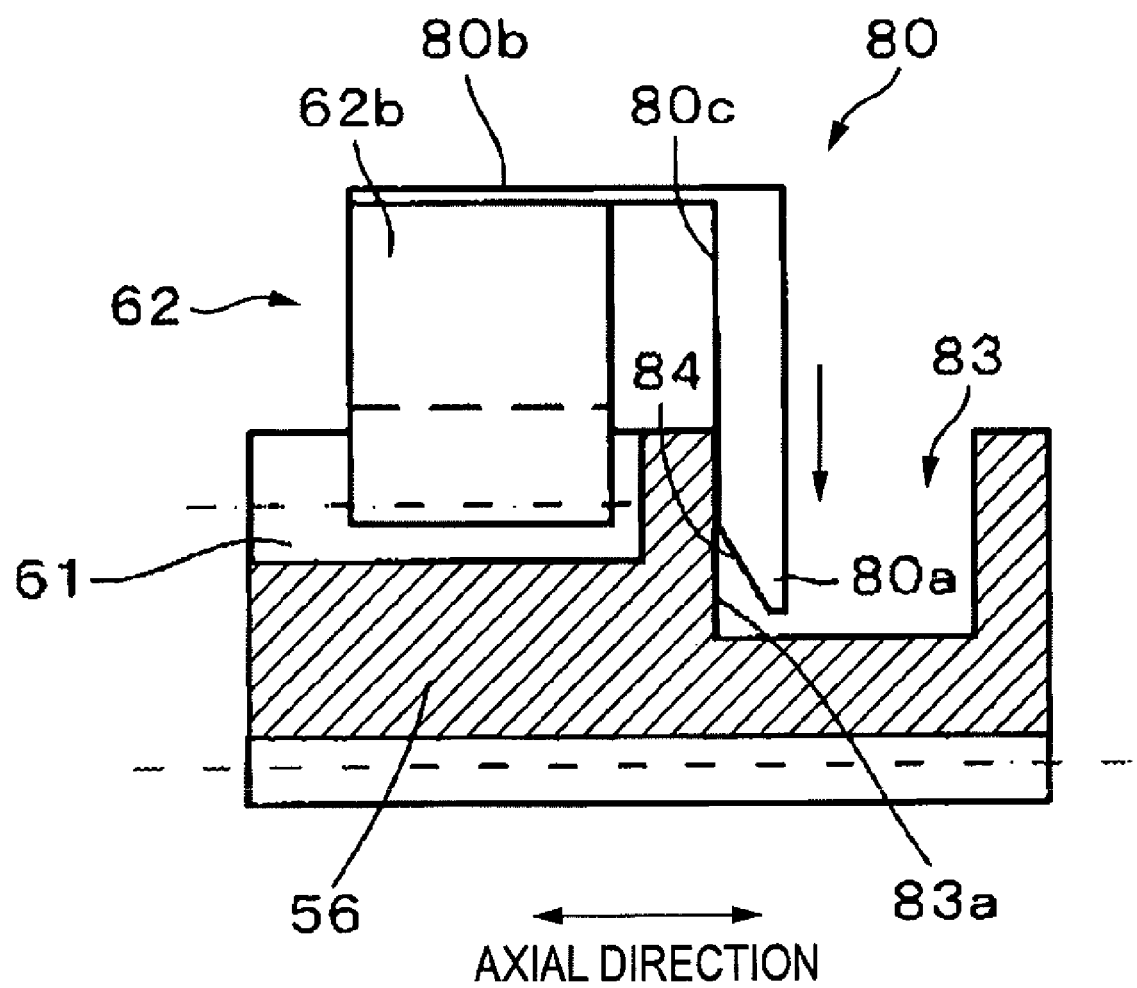
FIG. 6 is an enlarged view showing a state of restricting a sleeve by a sleeve restricting member.

Although according to the embodiment, the sleeve restricting member 80 is constituted by substantially the same plate thickness and the one end 80a is constituted to be inserted to the shift fork groove 83, as shown by FIG. 5, the side of the one end 80a inserted to the shift fork groove 83 may be formed to be thick in the axial direction, and an inclined guide portion 84 of pressing the parking gear 61 in the shift fork groove 83 in the axial direction may be formed. That is, the guide portion 84 for moving the parking gear 61 to the position of engaging with the claw member 62 may be formed at the sleeve restricting member 80. The guide portion 84 moves the synchronizer sleeve 56 (parking gear 61) by being brought into contact with an edge portion 83b of the shift fork groove 83 when the claw member 62 is moved in the engaging direction and the one end 80a is inserted to inside of the shift fork groove 83. The synchronizer sleeve 56 is constituted not to move in the axial direction unless the constant or more of force is exerted in the axial direction by the detent mechanism, not illustrated, and therefore, when the side of the one end 80a of the sleeve restricting member 80 is inserted to inside of the shift fork groove 83, as shown by FIG. 6, an inner face 80c of the sleeve restricting member 80 continuous from the guide portion 84 is brought into contact with an inner side face 83a of the shift fork groove 83, and therefore, the movement in the axial direction is restricted.

By providing the guide portion 84 at the sleeve restricting member 80, when the parking gear 61 and the claw member 62 are engaged, the synchronizer sleeve 56 is moved to the engaging position by the guide portion 84, and therefore, the engagement of the parking gear 61 and the claw member 62 is ensured and the parking brake can further stably be functioned. Further, even in a case in which when the sleeve 56 is returned from 5 speed shift state to a neutral position, the sleeve 56 cannot be returned since the restricting force or the detent mechanism is weak and the position of the sleeve 56 is shifted, the engagement of the parking gear 61 and the claw member 62 is further ensured by the guide groove 84, and the parking brake can further stably be functioned.

Further, the invention is not limited to the above-described one embodiment but may be embodied by being variously changed within the range not deviated from the gist of the invention. For example, although according to the one embodiment, the example of providing the synchronizing mechanism 51 most proximately to the escaped other end portion of the output shaft 40 is pointed out, the invention is not limited there to but is applicable in a case of arranging the driven gear 31 most proximately to other end portion by switching positions of the synchronizing mechanism 51 and the driven gear 31 of 5 speed.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicular transmission, comprising:
an input shaft inputted with a drive force from a side of an engine;
a drive gear fixed to the input shaft and rotated along with the input shaft;
an output shaft provided in parallel with the input shaft;
a bearing for rotatably supporting a shaft end of the output shaft;
a driven gear brought in mesh with the drive gear and provided rotatably the output shaft;
a hub fixed to the output shaft contiguous to the driven gear on a side of the shaft end of the output shaft and rotated along with the output shaft;
a sleeve arranged on an outer peripheral side of the hub, rotated normally integrally with the hub, and connecting the driven gear to the output shaft to drive by being moved to slide in an axial direction;
a parking gear integrally formed with the sleeve; and
a claw member arranged at a vicinity of an outer periphery of the parking gear engageably with and disengageably from the parking gear,
wherein the claw member is provided with a sleeve restricting member that engages with the sleeve at a position other than the parking gear for restricting the sleeve from being moved in the axial direction when the claw member is moved in a direction of being engaged with the parking gear.

2. The vehicular transmission according to claim 1, wherein
the sleeve restricting member is formed to project to a side of the parking gear more than a front end of the claw member engaged with the parking gear.

3. The vehicular transmission according to claim 1, wherein
the sleeve restricting member is made of a sheet metal.

4. The vehicular transmission according to claim 1, wherein
the sleeve restricting member includes a guide portion for moving the parking gear to a position of engaging with the claw member.

5. The vehicular transmission according to claim 1, wherein:
the parking gear is formed integrally with the shaft end portion of the sleeve; and
the parking gear and the bearing provided at the shaft end of the output shaft are arranged to overlap each other in the axial direction.

6. The vehicular transmission according to claim 1, further comprising:
an input mechanism including a first input shaft including respective drive gears of one speed change stage group of predetermined two groups divided from speed change stages, and a second input shaft including respective drive gears of other speed change group and provided pivotably around an axis core of the first input shaft at a surrounding of the first input shaft, and clutches respectively provided at one end portions of the first and the second input shafts for transmitting a drive force from a side of an engine to either of the first and the second input shafts; and
an output mechanism including first and second output shafts arranged in parallel with the first and the second input shafts and including a synchronizing mechanism of engaging driven gears brought in mesh with the drive gears of the first and the second input shafts with the first or the second output shaft, wherein
the sleeve is provided at the synchronizing mechanism engaged with the output shaft of a shorter one of the first and the second output shafts.

7. The vehicular transmission according to claim 1, wherein the sleeve is provided with a shift fork groove for sliding the sleeve in the axial direction, and the sleeve restricting member engages with a surface that defines the shift fork groove.

8. A vehicular transmission, comprising:
an input shaft inputted with a drive force from a side of an engine;
a drive gear fixed to the input shaft and rotated along with the input shaft;
an output shaft provided in parallel with the input shaft;
a bearing for rotatably supporting a shaft end of the output shaft;
a driven gear brought in mesh with the drive gear and provided rotatably at the output shaft;
a hub fixed to the output shaft contiguous to the driven gear on a side of the shaft end of the output shaft and rotated along with the output shaft;
a sleeve arranged on an outer peripheral side of the hub, rotated normally integrally with the hub, and connecting the driven gear to the output shaft to drive by being moved to slide in an axial direction;
a parking gear integrally formed with the sleeve; and
a claw member arranged at a vicinity of an outer periphery of the parking gear engageably with and disengageably from the parking gear,
wherein the claw member is provided with a sleeve restricting member for restricting the sleeve from being moved in the axial direction when the claw member is moved in a direction of being engaged with the parking gear, and
wherein the sleeve restricting member is formed to project to a side of the parking gear more than a front end of the claw member engaged with the parking gear.

9. The vehicular transmission according to claim 8 wherein the sleeve restricting member is made of a sheet metal.

* * * * *